(12) United States Patent
Taller

(10) Patent No.: US 8,956,225 B1
(45) Date of Patent: Feb. 17, 2015

(54) SYSTEM AND METHOD FOR USING FLASH SYMBOLS FOR TRAVEL NODES IN AN ONLINE FLASH-BASED GAME

(71) Applicant: Benjamin Taller, Berkeley, CA (US)

(72) Inventor: Benjamin Taller, Berkeley, CA (US)

(73) Assignee: Kabam, Inc., San Francisco, CA (US)

( * ) Notice: Subject to any disclaimer, the term of this patent is extended or adjusted under 35 U.S.C. 154(b) by 347 days.

(21) Appl. No.: 13/645,791

(22) Filed: Oct. 5, 2012

(51) Int. Cl.
*A63F 9/00* (2006.01)

(52) U.S. Cl.
USPC .......................................................... 463/31

(58) Field of Classification Search
USPC ....................................................... 463/9, 31
See application file for complete search history.

(56) References Cited

U.S. PATENT DOCUMENTS 8,182,320 B2 * 5/2012 Coleman et al. .................. 463/7
2005/0140668 A1 * 6/2005 Hlavac et al. ................. 345/419

OTHER PUBLICATIONS

Clark, Rhuardh, "Flash Game Developer Tutorial: Pathfinding with Dijkstra's Algorithm" Dec. 9, 2008, Mochiblog, 6 pages.
StackExchange, Stackoverflow, A* (A-star) implementation in AS3; http://stackoverflow.com/questions/2748602/a-a-star-implementation-in-as3, (Sep. 15, 2012, 12:03:50 PM), 4 pages.
Connelly, Tucker, "Flash AS3 Tile-Based Game Tutorial Pt. 15: Pathfinding", Iron Coding, written on May 22, 2011, http://ironcoding.com/2011/05/flash-as3-tile-based-game-tutorial-pt-15-pathfinding, (Sep. 15, 2012-12:02:34 PM), 13 pages.
"Flash Demonstration of A* Pathfinding" screenshot, http://www.antimodal.com/astar, (Sep. 15, 2012-12:04:14 PM), 1 page.

* cited by examiner

*Primary Examiner* — Reginald Renwick
(74) *Attorney, Agent, or Firm* — Pillsbury Winthrop Shaw Pittman LLP (57) ABSTRACT

One aspect of the disclosure relates to using FLASH symbols to define a travel grid formed by travel nodes in an online FLASH-based game. A FLASH symbol may be used that when instantiated defines a corresponding travel node that together with other travel nodes form a travel grid. The travel grid limits travel during gameplay by constraining travel from a travel node to its neighbor travel nodes. FLASH symbol properties may be leveraged to describe a travel node such as its location in the game space, neighbor travel nodes, and other information related to the travel node. In order to facilitate traversal of the travel grid formed by travel nodes, intelligence or other logic may configure a processor to obtain symbol properties of instantiated FLASH symbols that define travel nodes in order to dynamically make decisions during gameplay that determine next destinations to which travel is permitted.

21 Claims, 6 Drawing Sheets

SYSTEM AND METHOD FOR USING FLASH SYMBOLS FOR TRAVEL NODES IN AN ONLINE FLASH-BASED GAME

FIELD OF THE INVENTION

The disclosure relates to using FLASH symbols to define a travel grid formed by travel nodes in an online FLASH-based game.

BACKGROUND OF THE INVENTION

FLASH-based games may use command inputs to control movement of a graphical object in a virtual space of the game. Such movement is typically not constrained because only simple interactions within the virtual space with other graphical objects are usually sufficient for many FLASH-based games. However, as FLASH-based games become more complex beyond simple movement from one virtual location to another virtual location, having no constraints on travel can be problematic. Node-based travel, on the other hand, allows developers to rapidly develop more complex games by re-using travel nodes between different games, offer distinct checkpoints for score rewards or progress updates during gameplay, and provide other game features. However, FLASH may not natively support travel nodes in a manner that takes full advantage of node-based travel in games.

These and other drawbacks exist.

SUMMARY OF THE INVENTION

One aspect of the disclosure relates to using FLASH symbols to define a travel grid formed by travel nodes in an online FLASH-based game. Because native FLASH support for travel nodes as described herein may be unavailable, a FLASH symbol may be used that when instantiated defines a corresponding travel node that together with other travel nodes form a travel grid. The travel grid constrains where an object such as a graphical object may travel during gameplay. The constraints on travel may be achieved by specifying neighbor nodes to which travel is constrained from a given travel node, which may itself be a neighbor travel node. In this manner, individual travel nodes may be associated with neighbor travel nodes to which travel is constrained.

A developer may design the travel grid using travel nodes and their neighbor travel nodes defined by FLASH symbols in various configurations, specifying locations where a virtual object may travel during gameplay. Furthermore, the travel nodes may be re-used from one FLASH-based game to another FLASH-based game. Additionally, the travel nodes may be used as predefined checkpoints for score rewards, progress updates, and/or other game features.

Symbol properties of the FLASH symbol may be leveraged to describe a travel node. For example, one or more symbol properties may specify a location in the game space for the travel node, one or more neighbor travel nodes (defined by corresponding FLASH symbols), a direction to a neighbor travel node, a distance to a neighbor travel node, a time of travel (e.g., on a FLASH timeline) to a neighbor travel node, whether a travel node should be associated with a FLASH symbol that when instantiated is invisible, and/or other properties of the travel node.

In order to facilitate traversal of the travel grid formed by travel nodes, a FLASH-based game module that when executed by one or more processors may include intelligence or other logic that is configured to obtain symbol properties of instantiated FLASH symbols that define travel nodes in order to dynamically make decisions during gameplay that determine a next destination for a virtual object being controlled by the user.

When the FLASH-based game is instantiated, instances of the FLASH symbols may be disposed at various locations of the game space to indicate locations of corresponding travel nodes. A location in the game space (and therefore a location of a travel node) may correspond to a virtual location in the virtual space and vice versa.

For example, in a FLASH-based racing game, the virtual space may include a simulated city through which a virtual object such as a simulated car may be controlled by a user during gameplay. A particular location in the simulated city (of the virtual space) may correspond to a location in the game space, such as a location where a travel node is positioned.

As the virtual object that is controlled by the user traverses the virtual space, the virtual object may become associated with FLASH symbol instances. A virtual object may become associated with a FLASH symbol instance when the virtual object is positioned at a virtual location in the virtual space that corresponds to a location in the game space at or near where the FLASH symbol instance is disposed. The intelligence or other logic may be configured to determine whether the virtual object is associated with the FLASH symbol instance.

When the virtual object is associated with the FLASH symbol instance, the intelligence or other logic may obtain the symbol properties of the FLASH symbol instance and determine whether the FLASH symbol defines a travel node. When the instantiated FLASH symbol defines a travel node, its symbol properties may be obtained to determine one or more instantiated FLASH symbols that define travel nodes that are neighbors of the travel node.

For example, the virtual object may initially be associated with an instantiated FLASH symbol that defines a travel node. The instantiated FLASH symbol may include symbol properties that identify neighbor FLASH symbols that define neighbor travel nodes. The intelligence or other logic of the FLASH-based game module may constrain the next destination to which the virtual object may travel to the neighbor travel nodes.

The intelligence or other logic may receive a command input from the user during gameplay and select one of the neighbor travel nodes for the next destination based on the command input. As the virtual object travels to a virtual location corresponding to the selected neighbor, the virtual object may become associated with the instantiated FLASH symbol that defines the selected neighbor. The intelligence or other logic may obtain the symbol properties corresponding to the selected neighbor and may similarly constrain travel of the virtual object from the selected neighbor to its neighbors. This process may be repeated throughout the travel grid as necessary.

A system may be configured to use FLASH symbols for travel nodes in an online FLASH-based game. The system may include a server, a client computing platform, and/or other components.

The server may include electronic storage configured to store the FLASH-based game module that when executed on a client computing platform configures the client computing platform to execute a FLASH-based game that uses FLASH symbols for travel nodes. The server may include one or more processors configured to execute one or more modules such as a FLASH-based game communication module and/or other modules. The FLASH-based game communication module may be configured to communicate the FLASH-based game module to a client computing platform.

The client computing platform may include one or more processors configured to receive the FLASH-based game module and execute one or more modules such as a FLASH-based game generator module, the FLASH-based game module received from the server, and/or other modules. The FLASH-based game generator module may be configured to execute FLASH-based instructions such as the FLASH-based game module for executing a game for gameplay.

Leveraging FLASH-based symbols and symbol properties to define travel nodes allows for node-based travel in FLASH-based games. Instead of direction-only based travel in FLASH-based games, rapid development of more complex games, predefined levels during gameplay, checkpoints, scoring rewards at particular checkpoints, and other advantages of using node-based travel may be achieved.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
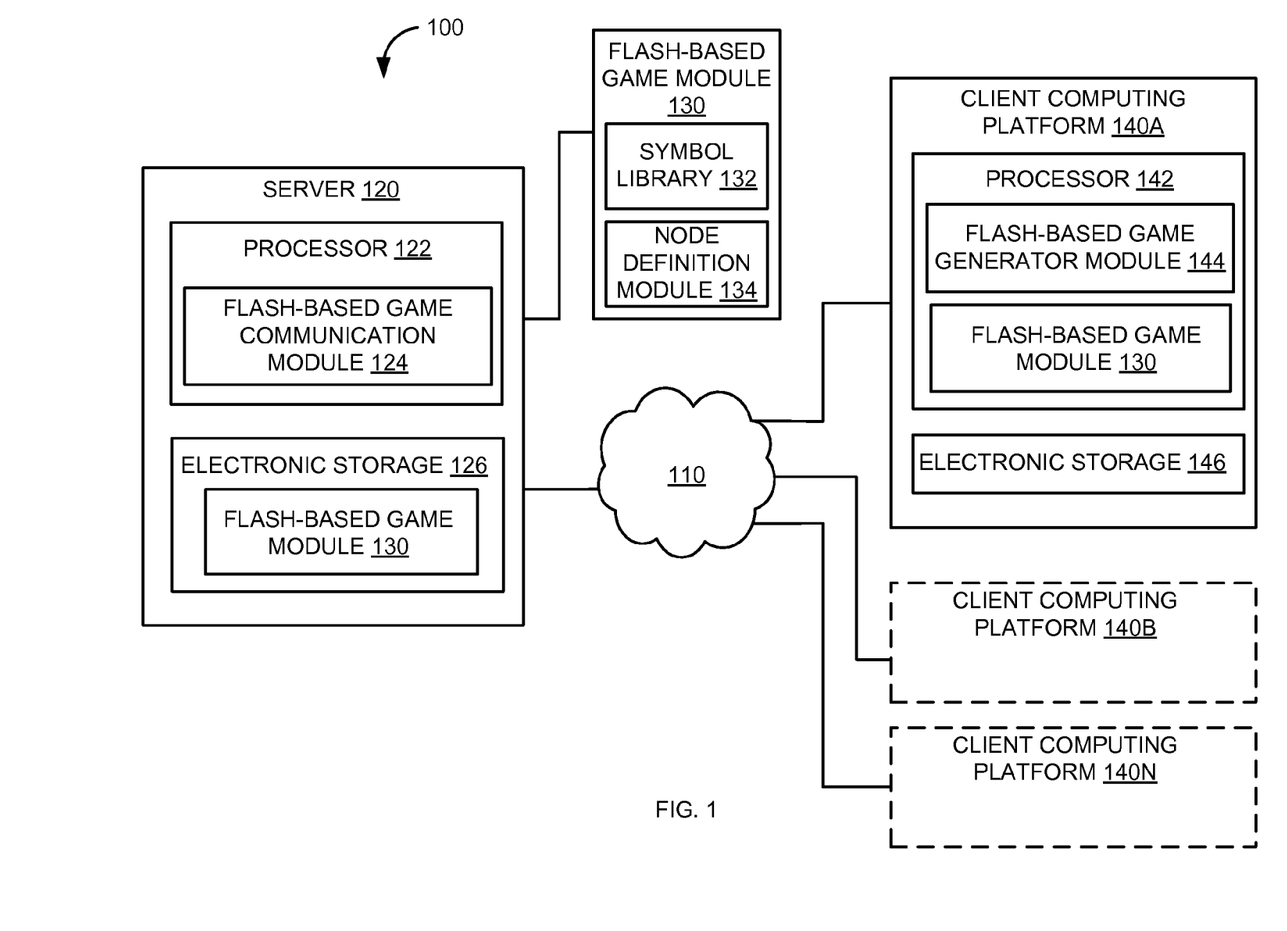
FIG. 1 illustrates a system of using FLASH symbols for travel nodes in an online FLASH-based game.

FIG. 1 illustrates a system 100 of using FLASH symbols for travel nodes in an online FLASH-based game. System 100 may include one or more of a server 120, one or more client computing platforms 140 (illustrated in FIG. 1 as client computing platforms 140A, 140B, . . . , 140N), and/or other components.

Server 120 may be configured to communicate with client computing platforms 140 in a server/client architecture and/or other architecture that facilitates communication between server 120 and client computing platforms 140. By way of non-limiting example, server 120 may be configured to host an online game, a virtual space, an online video, and/or other content.

Server 120 may include one or more processors 122, electronic storage 126, and/or other components. Processor 122 may provide information processing capabilities within server 120. Although processor 122 is illustrated in FIG. 1 as a single entity, this is not intended to be limiting, as processor 122 may include a plurality of processors operating in coordination or cooperation. This may include implementations in which server 120 includes multi-processor device, a farm of server devices operating together, and/or virtual resources provided by the cloud. Processor 122 may be configured to provide information to client computing platforms 140 over a network that causes the client computing platforms to present the FLASH-based game to users. For example, processor 122 may be programmed with a FLASH-based game communication module 124 that is configured to communicate a FLASH-based game module 130 to a client computing platform 140. When executed at the client computing platform 140, FLASH-based game module 130 causes the client computing platform to generate and present the FLASH-based game.

Electronic storage 126 may include electronic storage media that electronically stores information non-transiently. The electronic storage media of electronic storage 126 may include one or both of system storage that is provided integrally (i.e., substantially non-removable) with server 120 and/or removable storage that is removably connectable to server 120 via, for example, a port (e.g., a USB port, a firewire port, etc.) or a drive (e.g., a disk drive, etc.).

Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include virtual storage resources, such as storage resources provided via a cloud and/or a virtual private network. Electronic storage 126 may store software algorithms, information determined by processor 122, information received from client computing platforms 140, and/or other information that enables server 120 to function properly.

Electronic storage 126 may non-transiently store information prior to transmission to client computing platforms 140 that causes the client computing platform to present a FLASH-based game to users. For example, electronic storage 126 may store FLASH-based module 130, which when communicated to and executed at client computing platform 140 causes the client computing platform to present the FLASH-based game to the user for gameplay.

Server 120 may communicate FLASH-based game module 130 via a network 110. Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Client computing platforms 140 may receive FLASH-based game module 130 from server 120. Client computing platforms 140 may include computing platforms configured to provide an interface with users and system 100. A given client computing platform 140 may include one or more processors 142, electronic storage 146 that non-transiently stores information, and/or other components. By way of non-limiting example, the given client computing platform may include one or more of a smartphone, a handheld computer, a tablet device, a personal digital assistant, a laptop computer, a desktop computer, and/or other platforms.

Processor 142 may be programmed with a FLASH-based game generator module 144 that is configured to execute instructions such as FLASH-based game module 130 to generate the FLASH-based game. For example, FLASH-based game generator module 144 may include a FLASH plugin for Internet browser applications. Processor 142 may be programmed via FLASH-based game generator module 144 to execute FLASH-based game module 130, which may be received from server 120. FLASH-based game generator module 144 may receive command inputs on behalf of the FLASH-based game module for processing. In some embodiments, FLASH-based game module 130 may be stored in electronic storage 146 at client computing platform 140.

Having described an exemplary and non-limiting system configuration for storing, communicating, and executing FLASH-based game module 130, examples of functionality of the FLASH-based game module will now be described.

FLASH-based game module 130 may include instructions for implementing and instantiating a game space for the FLASH-based game. The game space may be traversed via a travel grid formed by travel nodes defined by FLASH symbols. The game space may be related to a racing game, a shooter game, and/or other type of game that may use the travel grid for traversing the game space.

FLASH-based game module 130 may include a symbol library 132, a node definition module 134, and/or other intelligence or components. Symbol library 132 may include the FLASH symbols. Node definition module 132 may be configured to obtain the FLASH symbols to define the travel nodes.

When the FLASH-based game is instantiated, instances of the FLASH symbols may be disposed at various locations of the game space to indicate locations of corresponding travel nodes. A location in the game space (and therefore a location of a travel node) may correspond to a virtual location in the virtual space. For example, in a FLASH-based racing game, the virtual space may include a simulated city through which a virtual object such as a simulated car may be controlled during gameplay. Other virtual objects may be controlled as well. A particular location in the simulated city (of the virtual space) may correspond to a travel node of the game space. FLASH-based game module 130 may generate the virtual objects associated with the virtual space as well as define a travel grid in which various travel nodes in the game space may be defined using FLASH symbols.

The controllable virtual object may be controlled based on a command input from the user during gameplay to cause the virtual object to travel through the virtual space corresponding to the travel grid of the game space. For example, the user may provide input to direct the controllable virtual object (e.g., the simulated car) from a virtual location corresponding to a travel node to another virtual location corresponding to another travel node.

Because native FLASH support for travel nodes as described herein may be unavailable, FLASH-based game module 130 may define travel nodes using FLASH symbols. In particular, a FLASH symbol that defines a travel node may include one or more symbol properties that specify a location in the game space where the travel node is to be located. For example, an instance of the FLASH symbol may be disposed at defined locations within the game space when the game space is instantiated (e.g., when a FLASH plugin executes the FLASH-based game module 130).

A symbol property may also identify a FLASH symbol by a unique identifier such that each FLASH symbol may be uniquely identified. In addition, because FLASH symbols may be used for objects other than travel nodes, a symbol property may identify a FLASH symbol as being used as a travel node when instantiated. Other ways to identify FLASH symbols as being used as travel nodes may be used as well, such as storing a listing of identifiers corresponding to such FLASH symbols.

In some embodiments, the one or more symbol properties may specify one or more neighbor FLASH symbols that when instantiated defines neighbor travel nodes to which a virtual object may travel. The travel grid may be formed by multiple travel nodes that may be neighbors of one another such that the travel grid may be traversed from one neighbor travel node to another neighbor travel node each defined by corresponding FLASH symbols and their symbol properties.

The symbol properties of a FLASH symbol may specify a distance, a time, a direction, and/or other location information to a neighbor FLASH symbol. In this manner, a developer may design the travel grid using travel nodes and their neighbor travel nodes defined by FLASH symbols in various configurations, specifying locations where a virtual object may travel during gameplay.

In order to facilitate traversal of the travel grid formed by travel nodes, FLASH-based game module 130 may include intelligence or other logic that is able to obtain symbol properties of instantiated FLASH symbols that define travel nodes in order to make decisions during gameplay that determine a next destination for the virtual object being controlled.

As the virtual object that is controlled by the user traverses the virtual space, the virtual object may become associated with FLASH symbol instances. A virtual object may become associated with a FLASH symbol instance when the virtual object is positioned at a virtual location in the virtual space that corresponds to a location in the game space at or near where the FLASH symbol instance is disposed. The intelligence or other logic may be configured to determine whether the virtual object is associated with the FLASH symbol instance.

For example, a virtual object such as the simulated car may initially be associated with an instantiated FLASH symbol that defines a travel node. The instantiated FLASH symbol may include symbol properties that identify neighbor FLASH symbols that define neighboring travel nodes. Based on the neighboring travel nodes, the intelligence or other logic of FLASH-based game module 130 may constrain the next destinations to which the virtual object may travel or be directed by the user to travel. As the virtual object travels to a neighbor travel node, the virtual object may become associated with the instantiated FLASH symbol that defines the neighbor travel node. The intelligence or other logic may obtain the symbol properties for the neighboring instantiated FLASH symbol that defines the neighbor travel node and similarly constrain travel of the virtual object from the neighbor travel node to a next destination based on the symbol properties of the neighboring instantiated FLASH symbol.

In some embodiments, an association between the graphical user object and a travel node may be apparent or unapparent to the user during gameplay. For example, a FLASH symbol that when instantiated defines the travel node may be invisible to the user (e.g., not displayed as a visible graphical object), displayed as a graphical object that is visible and stationary with respect to a controllable graphical object, or displayed as a graphical object that is visible and mobile with respect to the controllable graphical object. The visibility, mobility, and/or other feature of the travel node may be specified using symbol properties for the corresponding FLASH symbol.

In some embodiments, a symbol property may indicate that the instantiated FLASH symbol should be invisible. In these embodiments, the instantiated FLASH symbol that defines a travel node may be invisible to the user.

In some embodiments, a symbol property may indicate that the instantiated FLASH symbol should be visible and stationary with respect to the controllable graphical object. In these embodiments, the instantiated FLASH symbol that defines a travel node may be visible as a stationary graphical object. For example, the instantiated FLASH symbol may be visually depicted as part of the scenery at a location in the virtual space that corresponds to the location of the travel node of the game space.

In some embodiments, a symbol property may indicate that the instantiated FLASH symbol should be visible and mobile with respect to the controllable graphical object. In these embodiments, the instantiated FLASH symbol that defines a travel node may be visible as a moving graphical object. One or more instantiated FLASH symbols may be visually depicted as moving graphical objects not controlled by the user at locations in the virtual space that correspond to locations in the game space that the travel node may occupy.

For example, an individual travel node may include sub-travel nodes that occupy multiple locations in the game space and corresponding locations in the virtual space. The sub-travel nodes may each be defined by an individual symbol property or by a symbol property that includes an array of values corresponding to individual sub-travel nodes. The sub-travel nodes may be ordered such that when the controllable graphical object first encounters or is associated with the travel node, an initial location (e.g., an initial sub-travel node) may point to a next location (e.g., a next sub-travel node). This process may be repeated until all of the sub-travel nodes have been traversed.

In another example, multiple travel nodes (each defined by a corresponding instance of a FLASH symbol) may represent the moving graphical object. In this example, multiple instantiated FLASH symbols may be coordinated with one another to define different travel nodes that each depicts the same graphical object (or set of graphical objects). For example, in a driving game, graphical objects that represent vehicles that move but are not controllable (e.g., part of simulated traffic), may be defined by FLASH symbols that when instantiated define travel nodes and/or sub-travel nodes.

Figure 2:
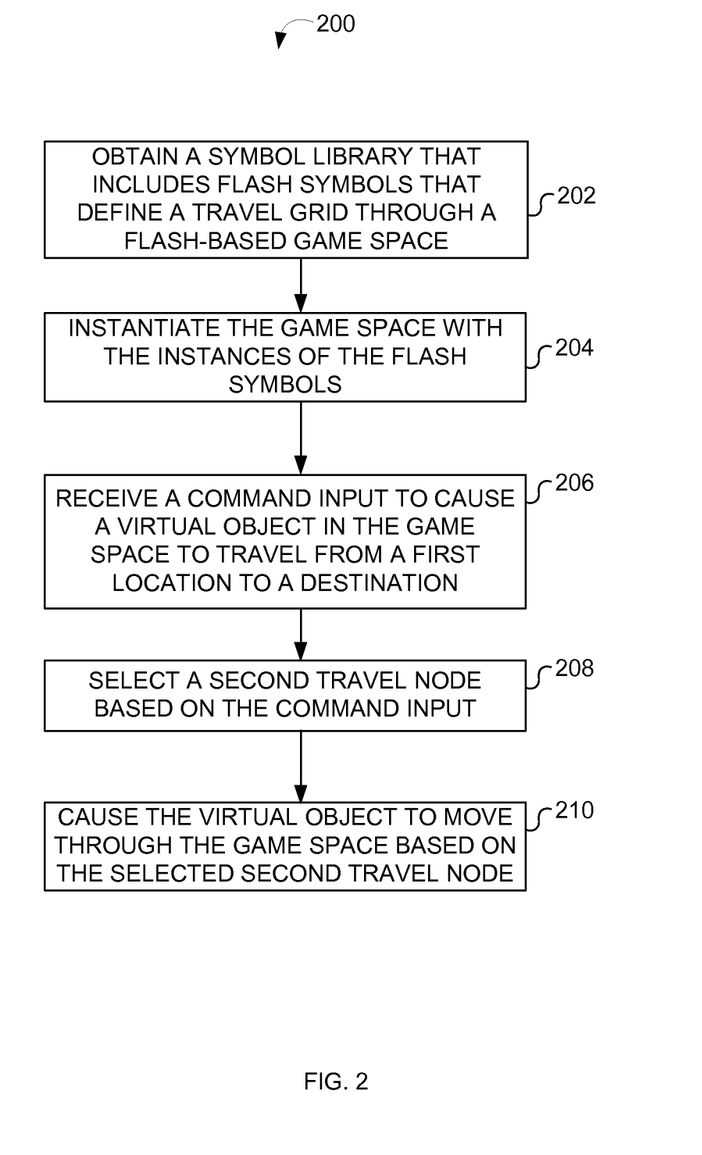
FIG. 2 illustrates a process of using FLASH symbols for travel nodes in an online FLASH-based game.

FIG. 2 illustrates a process 200 of using FLASH symbols for travel nodes in an online FLASH-based game. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, a FLASH symbol library may be obtained. The FLASH symbol library may include FLASH symbols that define a travel grid through a FLASH-based game space. The travel grid may be formed by travel nodes defined by the FLASH symbols. For example, a first symbol may define a first travel node by indicating a first location in the game space. The first symbol may also define a set of other travel nodes in the travel grid to which travel is constrained. Individual ones of the set of other travel nodes may also be defined by a corresponding FLASH symbol that also defines a set of other travel nodes to which travel may be constrained. Thus, the travel grid may include a network of travel nodes from which travel to other travel nodes are constrained.

In an operation 204, the FLASH-based game space may be instantiated with the instances of the FLASH symbols disposed at the indicated locations in the game space such that an instance of the first symbol is disposed at the first location. For example, the first location may include a starting location in the game space where a controllable graphical object may be initially positioned at the start of the FLASH-based game.

In an operation 206, a command input by a user may be received to cause a virtual object in the game space to travel from the first location to a destination. For example, the command input may include an indication to "move right" relative to the first location, go to a particular destination selected by the user, and/or other directional or command input.

In an operation 208, a second travel node defined by an instance of a second symbol disposed at a second location that corresponds to the direction of the destination may be selected based on a direction of the destination and locations of the first set of travel nodes in the game space. Based on the command input such as a directional input, the second travel node in the game space that most closely matches the command input may be selected. For example, based on a "move right" input, a travel node having a location that exists to the right of the first location in the game space may be selected.

As would be appreciated, "left," "right," "up," "down," etc., may be relative directional indicators that may be mapped to an absolute coordinate space. For example, the travel grid and travel nodes that form the travel grid may use an "X-Y" coordinate system or other absolute position indication system such that based on an orientation of the graphical object being controlled, "right" may be interpreted into the absolute coordinate system to find a travel node that is to the right of the first travel node. In the case where the command input may ambiguously identify multiple travel nodes, whichever travel node most closely satisfies the command input may be selected. Furthermore, other properties such as distance may be used to select the second travel node in ambiguous cases, where the closest travel node based on distance may be selected.

In an operation 210, the virtual object may be caused to move through a virtual space from a first virtual location corresponding to the first location to a second virtual location corresponding to the second location in response to the selection of the second travel node.

Figure 3:
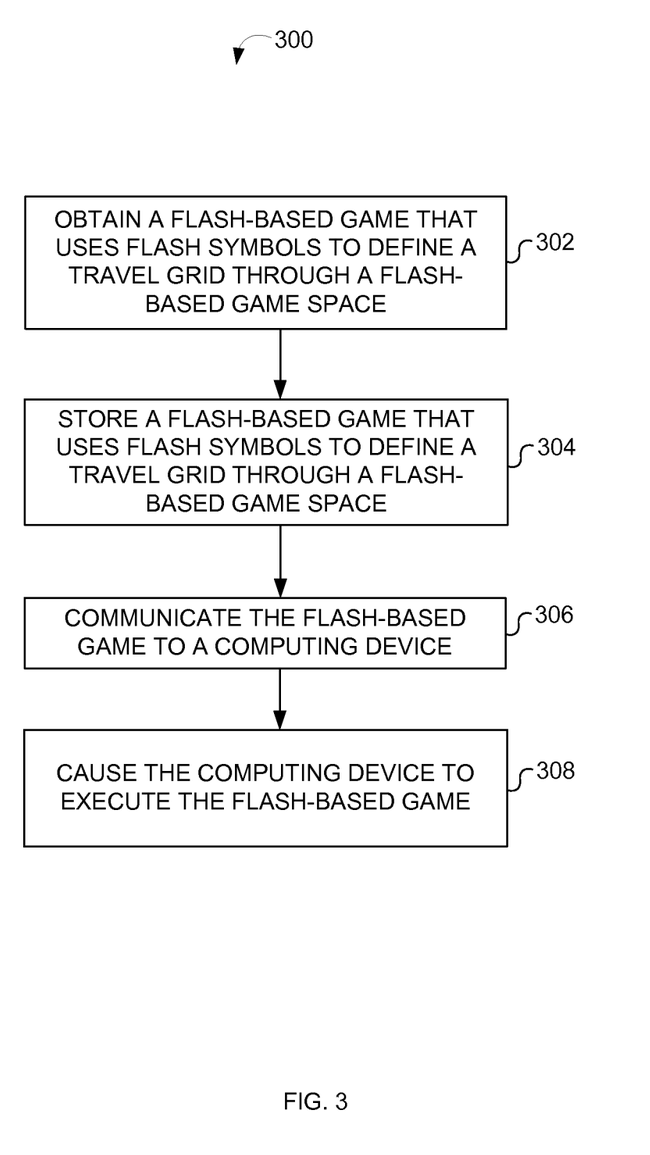
FIG. 3 illustrates a process of serving an online FLASH-based game that uses FLASH symbols for travel nodes.

FIG. 3 illustrates a process 300 of serving an online FLASH-based game that uses FLASH symbols for travel nodes. In an operation 302, a FLASH-based game that uses FLASH symbols to define a travel grid through a FLASH-based game space may be obtained. For example, a developer may design the FLASH-based game to be playable at client computer platforms. In an operation 304, the FLASH-based game may be saved. In an operation 306, the FLASH-based game may be communicated to a client computer platform. For example, the client computer platform may establish a network connection such as an Internet connection via a web browser with a server. The server may obtain the FLASH-based game from a memory and communicate the game to the client computer platform, which is caused to execute the FLASH-based game in an operation 308. The FLASH-based game may be executed using, for example, process 200 describe above in relation to FIG. 2.

Figure 4:
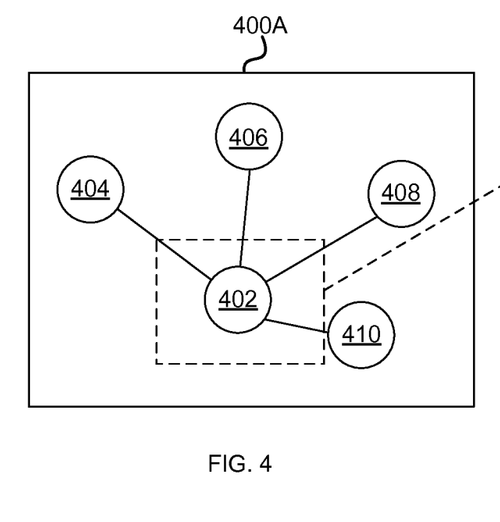
FIG. 4 illustrates examples of travel nodes in an online FLASH-based game.

FIG. 4 illustrates examples of travel nodes in an online FLASH-based game. As illustrated, a travel grid 400 (or portions thereof) in a game space may be formed from one or more travel nodes (illustrated in FIG. 4 as travel nodes 402, 404, 406, 408, and 410; referred to collectively as travel node 402-410 for convenience). During gameplay, a graphical object controlled by a user may occupy or otherwise be associated with a travel node 402-410. Travel grid 400 may be traversed by travelling from one travel node 402-410 to another travel node. Each travel node 402-410 may be associated with one or more neighbor travel nodes to which travel from the travel node may be constrained. As illustrated, travel node 402 includes a neighbor travel node 404, 406, 408, and 410, although more or less numbers of neighbors may be used. Each of neighbor travel nodes 404, 406, 408, and 410 may also include their own respective neighbor travel nodes (not illustrated in FIG. 4), thereby forming travel grid 400 that may be traversed from a travel node to its neighbor travel nodes.

Depending on a command input from the user and/or other event during gameplay, either neighbor travel node 402, 406, 408, or 410 may be selected as a destination to which travel from travel node 402 may occur. Neighbor travel nodes may be specified for a travel node using one or more symbol properties of a FLASH symbol that defines the travel node. For example, travel node 402 may be defined based on symbol properties as illustrated in FIG. 5.

Figure 5:
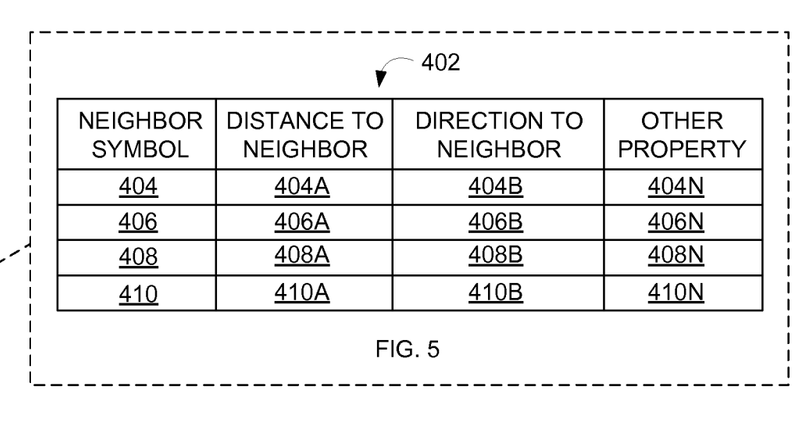
FIG. 5 illustrates examples of using FLASH symbols and FLASH symbol properties to define travel nodes.

Referring to FIG. 5, a FLASH symbol that defines travel node 402 may include symbol properties that specify a neighbor symbol (illustrated in FIG. 5 as neighbor symbol 604, 606, 608, 610), a distance to a neighbor (illustrated in FIG. 5 as distance to neighbor 604A, 606A, 608A, 610A), a direction to a neighbor (illustrated in FIG. 5 as direction to neighbor 604B, 606B, 608B, 610B), and/or other properties. These other properties may include, for example, an indication of the location of travel node 402 in the game space, an indication of the location of a neighbor travel node in the game space, whether travel node 402 should be invisible, visible and stationary, visible and mobile, a type of graphical object to display if visible, and/or property that may describe travel node 402. During gameplay, the various properties may be obtained in order to determine a next destination based on a command input and/or other event occurring in the FLASH-based game.

Figure 6A:
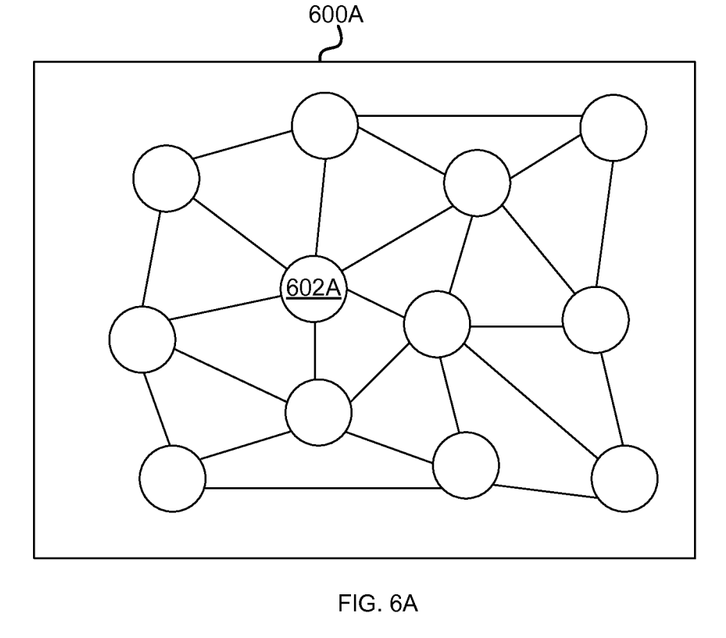
FIGS. 6A, 6B, and 6C illustrate examples of different configurations of travel nodes in a game space using FLASH symbols in an online FLASH-based game.
Figure 6B:
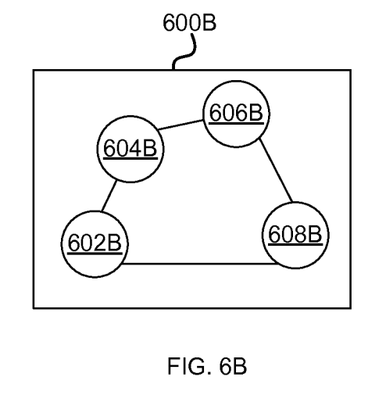
Figure 6C:
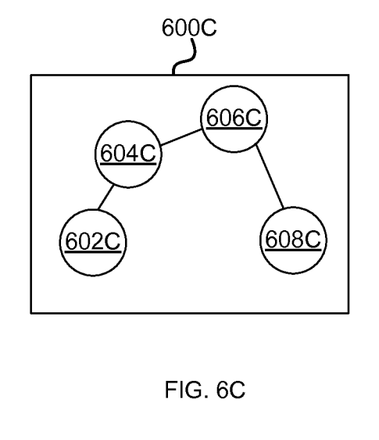

FIGS. 6A, 6B, and 6C illustrate examples of different configurations of travel nodes 602 forming a travel grid 600 of a game space using FLASH symbols in an online FLASH-based game. As illustrated in FIG. 6A, travel grid 600A may be formed from a network of travel nodes 602 (only one travel node is labeled for convenience) that may each be connected to various neighbor travel nodes. Various configurations of travel nodes 602 forming travel grid 600A may be used, such as adding or omitting connections between some of the travel nodes 602 that allow flexible design of travel grids as needed. Travel grid 600A may provide for more complex navigation through the travel grid during gameplay than as illustrated in FIGS. 6B and 6C.

As illustrated in FIG. 6B, travel grid 600B may be formed by travel nodes (illustrated in FIG. 6B as travel node 602B, 604B, 606B, 608B) that are each connected to two neighbor travel nodes. In this embodiment, a closed path between travel nodes may be provided, where a FLASH-based game (or level) may start at, for example, travel node 602B or other travel node and loop around until an appropriate termination is determined. As illustrated in FIG. 6C, travel grid 600C may be formed by travel nodes (illustrated in FIG. 6C as travel node 602C, 604C, 606C, 608C) that are each connected to two neighbor travel nodes. In this embodiment, an open path between travel nodes may be provided, where a FLASH-based game (or level) may start at, for example, travel node 602C and terminate at, for example, travel node 608C.

Figure 7A:
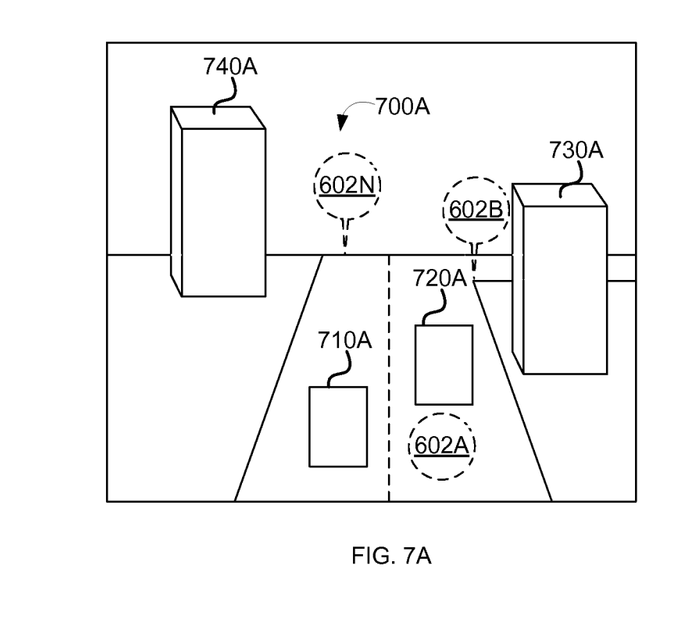
FIGS. 7A and 7B illustrate examples of a virtual space having virtual locations corresponding to travel nodes in a game space.
Figure 7B:
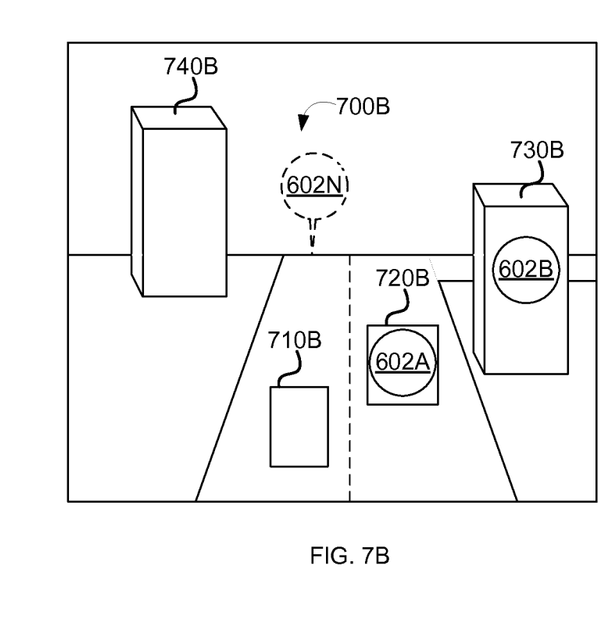

FIGS. 7A and 7B illustrate examples of a virtual space having virtual locations corresponding to travel nodes in a game space. The virtual spaces illustrated in FIGS. 7A and 7B are non-limiting examples, as other types and configurations of virtual spaces as well as graphical objects illustrated therein are contemplated. For example, although illustrated as a perspective virtual space in FIGS. 7A and 7B, a two-dimensional, top-down, ("board game") style virtual space may be depicted.

FIGS. 7A and 7B each illustrate virtual spaces 700 (illustrated in the Figures as virtual space 700A and 700B) depicting a virtual roadway along which a controllable graphical object 710 (illustrated in the Figures as objects 710A and 710B) and a graphical object 720 (illustrated in the Figures as objects 720A and 720B) may be simulated to travel. Other graphical objects 730 and 740 (illustrated in the Figures as objects 730A, 730B, 740A, 740B) may also be included in virtual space 700. Various travel nodes 602 (illustrated in the Figures as travel nodes 602A, 602B, . . . , 602N) may be placed at various locations in the game space that correspond to locations in the virtual space 700.

Still referring to both FIGS. 7A and 7B, during gameplay, as controllable graphical object 710 becomes associated with travel node 602A (e.g., passes by or onto a virtual location of virtual space 700 associated with travel node 602A in the game space), the symbol properties of the instantiated FLASH symbol that defines travel node 602A may be obtained in order to determine neighbor travel nodes in the travel grid to which graphical object 710 may next travel. For example, graphical object 710 may travel to travel node 602B or 602N from travel node 602A as illustrated depending on a command input from the user that indicates where the user would like for graphical object 710 to travel (e.g., an indication to turn right in the virtual space 700A may cause travel to travel node 602B in the game space whereas an indication to stay straight, or no indication, may cause travel to a virtual location associated with travel node 602N).

Referring to FIG. 7A, travel nodes 602 may be defined by FLASH symbols that include a symbol property indicating that an instance of the FLASH symbol is to be invisible. For example, as illustrated in FIG. 7A, travel node 602A is defined by a FLASH symbol that is not visible to the user.

Referring to FIG. 7B, at least some travel nodes 602 may be defined by FLASH symbols that include a symbol property indicating that an instance of the FLASH symbol is to be visible. In some embodiments, a travel node 602 may be defined by a FLASH symbol that include a symbol property indicating that an instance of the FLASH symbol is to be visible and mobile with respect to graphical object 710B. For example, travel node 602A may be defined by a FLASH symbol that when instantiated is displayed as a graphical object 720B that moves.

In some embodiments, a travel node 602 may be defined by a FLASH symbol that includes a symbol property indicating that an instance of the FLASH symbol is to be visible and stationary (e.g., part of scenery). For example, travel node 602B may be defined by a FLASH symbol that when instantiated is displayed as a graphical object 730B such as a virtual building that does not move within virtual space 700B. As illustrated in FIG. 7B, invisible, visible and mobile, and/or visible and stationary travel nodes may be used. For example, travel node 602N may be defined by a FLASH symbol that includes a symbol property indicating that an instance of the FLASH symbol is to be invisible.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to set travel nodes in a FLASH-based game, the system comprising:
one or more processors configured to execute computer program modules, the computer program modules comprising:
a node definition module configured to:
obtain a symbol library that includes a plurality of FLASH symbols that define a travel grid through a FLASH-based game space, wherein the travel grid is formed by a plurality of travel nodes defined by the FLASH symbols, and wherein the FLASH symbols include a first symbol that defines a first travel node by indicating (i) a first location of the first travel node in the game space, and (ii) a first set of one or more other travel nodes in the travel grid to which direct travel from the first location is constrained during gameplay;
a FLASH-based game generator module configured to:
instantiate the FLASH-based game space with the instances of the FLASH symbols disposed at the indicated locations in the game space such that an instance of the first symbol is disposed at the first location;
receive a command input by a user to cause a virtual object in the game space to travel from the first location to a destination;
select, based on a direction of the destination and locations of the first set of travel nodes in the game space, a second travel node defined by an instance of a second symbol disposed at a second location that corresponds to the direction of the destination; and
cause the virtual object to move through a virtual space from a first virtual location corresponding to the first location to a second virtual location corresponding to the second location in response to the selection of the second travel node.

2. The system of claim 1, wherein the command input specifies a direction to move the virtual object or a next travel node to which to move the virtual object.

3. The system of claim 1, wherein the first symbol includes at least one symbol property that specifies the first location of the first travel node in the game space, the first set of one or more other travel nodes in the travel grid to which direct travel from the first location is constrained during gameplay, or both.

4. The system of claim 3, wherein the at least one symbol property comprises a property that causes the corresponding FLASH symbol instance to be invisible during gameplay.

5. The system of claim 3, wherein the at least one symbol property indicates a distance, a direction, or both the distance and the direction to at least one of the first set of one or more other travel nodes in the travel grid.

6. The system of claim 1, wherein at least some of the FLASH symbols are each instantiated into a single FLASH symbol instance.

7. The system of claim 1, wherein the FLASH-based game generator module is configured to:
instantiate the game space with an instance of a FLASH symbol for the virtual object that interacts with the instances of the FLASH symbols disposed at the indicated locations in the game space to determine a location in the game space where the virtual object is located.

8. A method of setting travel nodes in a FLASH-based game, the method being implemented by one or more processors executing one or more computer program modules, the method comprising:
obtaining, by a node definition module, a symbol library that includes a plurality of FLASH symbols that define a travel grid through a FLASH-based game space, wherein the travel grid is formed by a plurality of travel nodes defined by the FLASH symbols, and wherein the FLASH symbols include a first symbol that defines a first travel node by indicating (i) a first location of the first travel node in the game space, and (ii) a first set of one or more other travel nodes in the travel grid to which direct travel from the first location is constrained during gameplay;
instantiating, by a FLASH-based game generator module, the game space with the instances of the FLASH symbols disposed at the indicated locations in the game space such that an instance of the first symbol is disposed at the first location;
receiving, by the FLASH-based game generator module, a command input by a user to cause a virtual object in the game space to travel from the first location to a destination;
selecting, FLASH-based game generator module, based on a direction of the destination and locations of the first set of travel nodes in the game space, a second travel node defined by an instance of a second symbol disposed at a second location that corresponds to the direction of the destination; and
causing, by the FLASH-based game generator module, the virtual object to move through the game space from a first virtual location corresponding to the first location to a second virtual location corresponding to the second location in response to the selection of the second travel node.

9. The method of claim 8, wherein the command input specifies a direction to move the virtual object or a next travel node to which to move the virtual object.

10. The method of claim 8, wherein the first symbol includes at least one symbol property that specifies the first location of the first travel node in the game space, the first set of one or more other travel nodes in the travel grid to which direct travel from the first location is constrained during gameplay, or both.

11. The method of claim 10, wherein the at least one symbol property comprises a property that causes the corresponding FLASH symbol instance to be invisible during gameplay.

12. The method of claim 10, wherein the at least one symbol property indicates a distance, a direction, or both the distance and the direction to at least one of the first set of one or more other travel nodes in the travel grid.

13. The method of claim 8, wherein at least some of the FLASH symbols are each instantiated into a single FLASH symbol instance.

14. The method of claim 8, the method further comprising:
instantiating, by the FLASH-based game generator module, the game space with an instance of a FLASH symbol for the virtual object that interacts with the instances of the FLASH symbols disposed at the indicated locations in the game space to determine a location in the game space where the virtual object is located.

15. A server configured to communicate a FLASH-based game that uses travel nodes in the FLASH-based game, the server comprising:

a storage device configured to store a FLASH-based game module;

one or more processors configured to communicate the FLASH-based game module to a computing device, the FLASH-based game module when executed on one or more processors of the computing device causes the computing device to:

obtain a symbol library that includes a plurality of FLASH symbols that define a travel grid through a FLASH-based game space, wherein the travel grid is formed by a plurality of travel nodes defined by the FLASH symbols, and wherein the FLASH symbols include a first symbol that defines a first travel node by indicating (i) a first location of the first travel node in the game space, and (ii) a first set of one or more other travel nodes in the travel grid to which direct travel from the first location is constrained during gameplay;

instantiate the game space with the instances of the FLASH symbols disposed at the indicated locations in the game space such that an instance of the first symbol is disposed at the first location;

receive a command input by a user to cause a virtual object in the game space to travel from the first location to a destination;

select, based on a direction of the destination and locations of the first set of travel nodes in the game space, a second travel node defined by an instance of a second symbol disposed at a second location that corresponds to the direction of the destination; and cause the virtual object to move through the game space from a first virtual location corresponding to the first location to a second virtual location corresponding to the second location in response to the selection of the second travel node.

16. The server of claim 15, wherein the command input specifies a direction to move the virtual object or a next travel node to which to move the virtual object.

17. The server of claim 15, wherein the first symbol includes at least one symbol property that specifies the first location of the first travel node in the game space, the first set of one or more other travel nodes in the travel grid to which direct travel from the first location is constrained during gameplay, or both.

18. The server of claim 17, wherein the at least one symbol property comprises a property that causes the corresponding FLASH symbol instance to be invisible during gameplay.

19. The server of claim 17, wherein the at least one symbol property indicates a distance, a direction, or both the distance and the direction to at least one of the first set of one or more other travel nodes in the travel grid.

20. The server of claim 15, wherein at least some of the FLASH symbols are each instantiated into a single FLASH symbol instance.

21. The server of claim 15, wherein the node definition module when executed at the computing device further causes the computing device to:

instantiate the game space with an instance of a FLASH symbol for the virtual object that interacts with the instances of the FLASH symbols disposed at the indicated locations in the game space to determine a location in the game space where the virtual object is located.

* * * * *